United States Patent Office 3,812,191
Patented May 21, 1974

3,812,191
PROCESS FOR PRODUCING DEVELOPERS FOR SILVER HALIDE IMAGE PATTERNS
Henry Bader, Newton Center, and Michael Feingold, Pinehurst, Mass., and Edwin G. Jahngen, Jr., Burlington, Vt., assignors to Polaroid Corporation, Cambridge, Mass.
No Drawing. Filed July 19, 1971, Ser. No. 164,102
Int. Cl. C07c 49/82
U.S. Cl. 260—590          10 Claims

ABSTRACT OF THE DISCLOSURE

A novel process for producing compounds especially useful as developers for silver halide image patterns. Essentially, the process of the invention involves the saponification of a compound of the following formula:

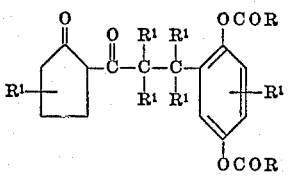

FORMULA 1.

in a non-aqueous alkaline medium followed by acidification to provide a compound conforming to the following formula:

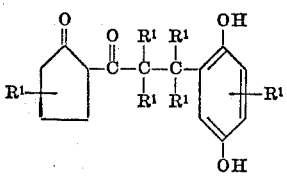

FORMULA 2.

wherein the —OCOR groups at the ortho and para positions of the phenyl ring represent groups that can be substituted with or converted to hydrogen so as to provide hydroxy moieties in the ortho and para positions and $R^1$ represents a substituent which can be the same or different and which does not affect the functionality of the compound as a silver halide developing agent.

BACKGROUND OF THE INVENTION

Part 1.—The field of the invention

This invention relates to photography. More precisely, the invention disclosed herein relates to a process for producing compounds which can be employed as silver halide developers but are especially useful as intermediates for providing metal complexed dyes employed in developing silver halide image patterns.

Part 2.—Description of the prior art

Metallized dyes having a silver halide developing capability are known to the art. Essentially, such dyes may be defined as compounds having a moiety of the following formula:

Y—Z

FORMULA 3.

bonded to the complexing atom and wherein Y is a radical comprising a silver halide developing substituent and Z is a ligand radical, i.e., a radical of a compound containing one or more coordinating or donor atoms for forming a metal complex.

More precisely, such metallized dyes can be illustrated schematically as follows:

Dye—Me—Ligand Developer

FORMULA 4.

wherein "Dye" is a chelatable dye, "Me" is a metal complexing atom, and "Ligand Developer" is a substantially colorless ligand contributing at least one and preferably two of the coordinating or donor atoms necessary to form the desired complex and wherein the ligand contains a silver halide developing agent or substituent.

Chelatable dyes suitable as Dye in the above Formula 4 are known to the art and include among others, those providing the following structure with the complexing metal atom:

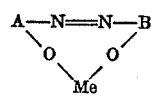

FORMULA 5.

wherein A is an aromatic radical, e.g., a substituted or non-substituted phenyl or naphthyl radical; B is an aromatic or heterocyclic radical, e.g., a substituted or non-substituted phenyl, naphthyl or pyrazolene radical and

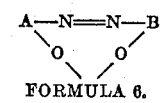

FORMULA 6.

is the radical of an ortho, ortho' dihydroxy azo dye of the formula:

A—N=N—B
|        |
OH      OH

FORMULA 7.

and Me is a metal complexing atom, e.g., a transition metal particularly a metal of the first transition series, i.e., chromium, copper, cobalt, nickel, iron, zinc, manganese, scandium, titanium and vanadium. Other useful metals such as aluminum, silver, palladium, and platinum will be apparent to those skilled in the art. Details relating to metallized dyes of the above described type can be found in commonly assigned U.S. Pat. 3,453,107, issued July 1, 1969 to Elbert M. Idelson.

Another class of chelatable dyes suitable as Dye in Formula 4 are those providing the following structure with the complexing metal atom:

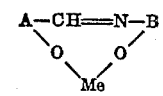

FORMULA 8.

wherein A, B and Me are as defined above and

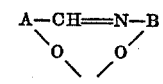

FORMULA 9.

is the radical of an ortho, ortho' azomethine dye of the formula:

A—CH=N—B
|         |
OH       OH

FORMULA 10.

Details relating to metallized dyes containing this class of dye are described in commonly assigned applications Ser. No. 830,499, filed June 4, 1969 by Elbert M. Idelson, now U.S. Pat. No. 3,597,200 and Ser. No. 830,480, filed June 4, 1969 by Arthur B. Goulston and Paul S. Huyffer.

Ligand developers which qualify as a "Lignad Developer" of Formula 4 are also known to the art. As mentioned, such ligand developers conform to Formula 3, e.g., $$Y-Z$$

wherein Y is a radical comprising a silver halide developing substituent and Z is a ligand radical. Specific classes of ligand developers can be defined by the following formulae:

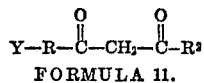

FORMULA 11.

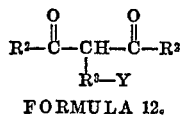

FORMULA 12.

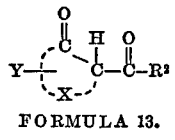

FORMULA 13.

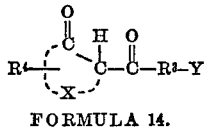

FORMULA 14.

wherein:

R is an alkylene radical having from 1–6 carbon atoms or a substituent chosen from the group consisting of

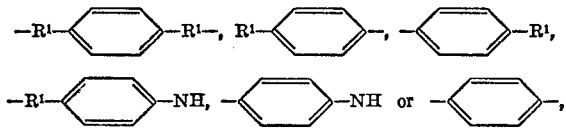

and $R^1$ is an alkylene radical having from 1–6 carbon atoms; each $R^2$ is hydrogen or an alkyl radical having from 1–6 carbon atoms;

each $R^3$ is an alkylene radical having from 1–6 carbon atoms; and $R^4$ is an alkyl radical having from 1–3 carbon atoms, an alkoxy radical having from 1–3 carbon atoms or H;

X represents the atoms necessary to complete a cyclopentane, cyclohexane or a benzene ring; and Y is ortho or paradihydroxyphenyl or a protected derivative thereof.

Additional details relating to the above described ligand developers can be found in commonly assigned U.S. patent application Ser. No. 881,323, filed Dec. 1, 1969 by Elbert M. Idelson, now U.S. Pat. No. 3,629,336.

Particularly useful metallized dyes of Formula 4 are those conforming to the following formulae:

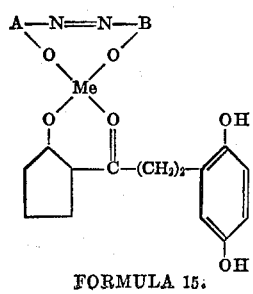

FORMULA 15.

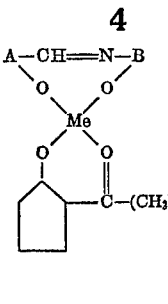

FORMULA 16.

wherein it can be seen that both dyes have as their dye developing moiety, a compound of Formula 2, e.g.,

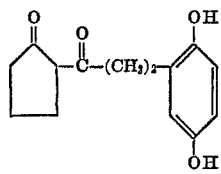

2-[3-(2,5-dihydroxyphenyl)propionyl] cyclopentanone.

The present invention provides a relatively simple process for consistently providing compounds of Formula 2 in especially high yields.

SUMMARY OF THE INVENTION

The process of the present invention involves the steps of saponifying a compound of Formula 1 in a non-aqueous alkaline medium and thereafter acidifying the saponified product to a pH between about 6.0 to 7.0 and preferably to a pH between about 6.5–7.0. As mentioned, compounds of Formula 1 conform to the following formula:

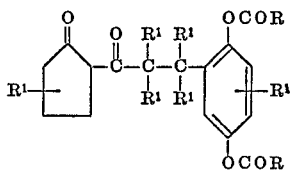

wherein the —OCOR groups at the ortho and para positions of the phenyl ring represent groups that are hydrolyzable or otherwise convertible to provide hydroxy moieties at the ortho and para positions. Accordingly, R can be alkyl, alkoxy, aryl, aralkyl etc. Each $R^1$ is a substituent which can be the same or different but does not affect the ultimate functionality of the compound as a silver halide developer. $R^1$ accordingly can be hydrogen, an alkyl radical, an alkoxy radical, an aryl radical, an amino radical, an alkamino radical etc. An especially preferred compound of Formula 1 is 2-[3-(2,5-dicathyloxyphenyl propionyl] cyclopentanone which as mentioned before conforms to the following formula:

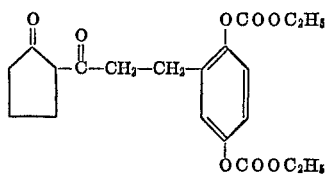

Non-aqueous alkaline media suitable in the practice of the present invention include organic solutions of alkali metal hydroxides, e.g., sodium hydroxide, potassium hydroxide, etc. Especially preferred are solutions of the hydroxide in alcohols such as methyl Cellosolve, methanol, ethanol, propanol, isopropanol, etc. The acidification of the above mentioned solutions to a pH of between about 6.0 to about 7.0 is preferably done with the organic acids, e.g., acetic acid, benzoic acid, citric acid, maleic acid, oxalic acid, tartaric acid, etc. or mixtures thereof. However, the stronger inorganic acids can be employed.

In accordance with the practice of the present invention, the conversion of a compound of Formula 1 to a compound of Formula 2 has been found to be a sensitive, complicated reaction and in order to obtain high yields, precise control must be maintained over particular reaction conditions involved in the conversion. For example, it has been found that effective saponification of the compound of Formula 1 requires the use of essentially non-aqueous alkaline media which for the purposes of the present invention are defined as alkaline media initially containing less than 0.5% of water. The reason for defining the essentially non-aqueous media in terms of its initial water concentration resides in the art recognized fact that water is a product of the saponification reaction. Accordingly after saponification is complete, the media of the present invention will contain some water but the amount will correspond very closely to that theoretically possible from the saponification reaction alone.

Those skilled in the art know that aqueous media are commonly and routinely employed in saponification reactions. However as shown in the Examples which follow, attempts to saponify a compound of Formula 1, e.g., 2-[3-(2,5-dicathyloxyphenyl)propionyl] cyclopentanone in such aqueous or partially aqueous media followed by acidification have provided mixtures of products wherein the predominant product is one which results in ring cleavage of the cyclopentanone ring and conforms to the following structure:

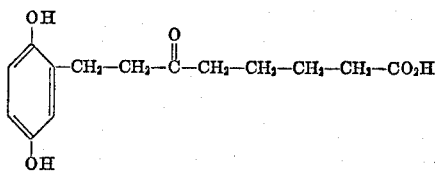

FORMULA 17.

Other products obtained in the mixtures include compounds of Formulae 18–20 which follow:

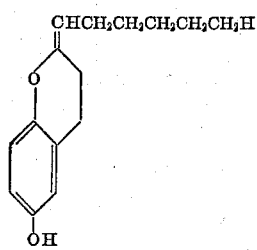

FORMULA 18.

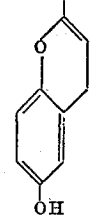

FORMULA 19.

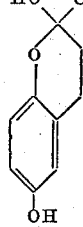

FORMULA 20.

In addition to the use of an essentially nonaqueous alkaline media in the saponification of the compound of Formula 1, the acidification of the saponified compound must also be closely controlled in order to assure high yields of the compound of Formula 2. For example, if a compound of Formula 1 is saponified in an essentially non-aqueous alkaline media and thereafter acidified to a pH below about 6.0, a mixture of products is obtained wherein the compound of Formula 2 is present in low, commercially unattractive yields. Instead the predominant products are those resulting from cyclization or dehydration reactions which provide compounds of the following structures:

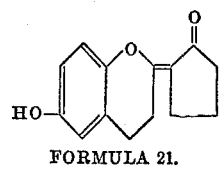

FORMULA 21.

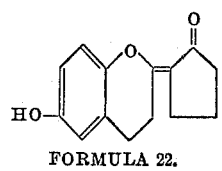

FORMULA 22.

Obviously, specialized, time-consuming separation techniques must be applied to the mixtures produced in the above described manners to recover the relatively minor amount of the compound of Formula 2 present. In contrast thereto, the practice of the process of the present invention provides a relatively simple method for converting the compound of Formula 1 to the compound of Formula 2 and at the same time consistently provides high yields of the desired product.

DESCRIPTION OF PREFERRED EMBODIMENTS

The following illustrative Examples are presented so that those skilled in the art can better understand the practice of the present invention and better appreciate the advantages thereof.

The following Example illustrates a preferred synthesis of a preferred compound of Formula 1, e.g., 2-[3-(2,5-dicathyloxyphenyl)propionyl] cyclopentanone in accordance with the following sequence of steps:

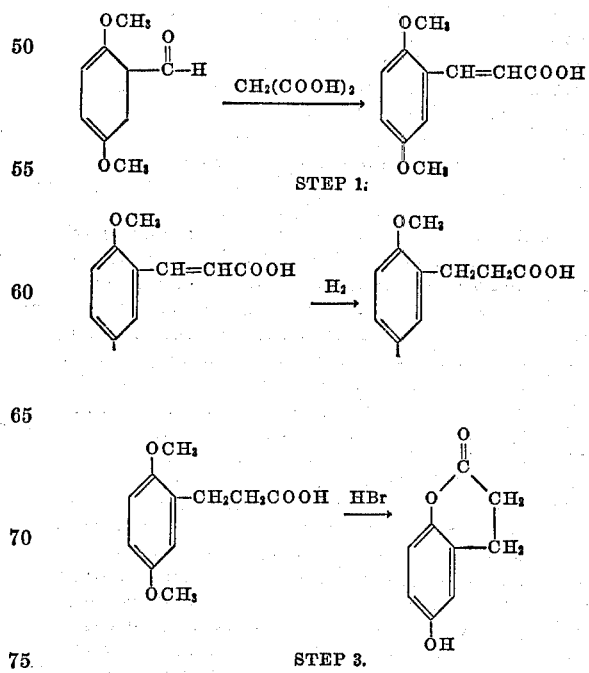

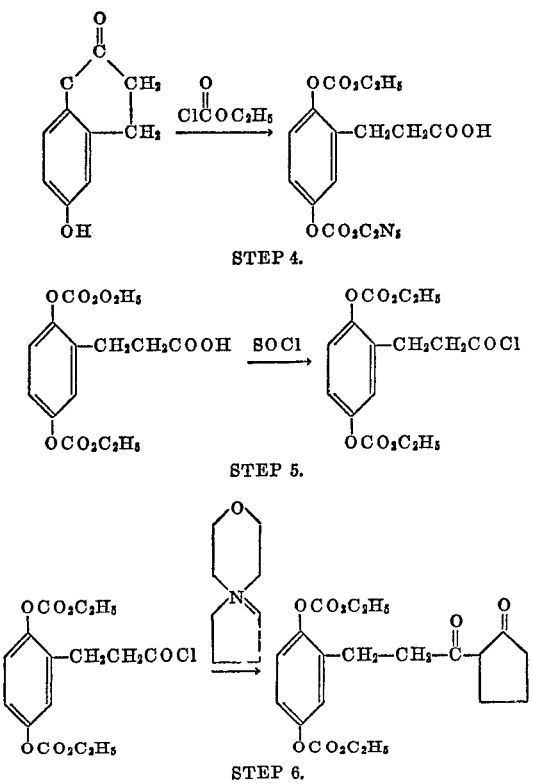

STEP 4.

STEP 5.

STEP 6.

The compound

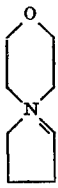

of step 6 is produced by the following reaction

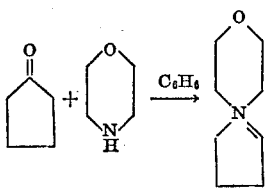

EXAMPLE 1

Step 1

A mixture of 447 g. of 2,5-dimethoxybenzaldehyde, 559 g. of malonic acid and 1080 ml. of pyridine was heated to 50° C. to obtain solution; then 40 ml. of piperidine were added and the reaction mixture heated at 80–85° C. for two hours followed by refluxing for an additional three hours. The solution was cooled overnight, then poured into 11 l. of water and acidified slowly with one l. of conc. hydrochloric acid to provide the product 2,5-dimethoxycinnamic acid which was filtered and washed with water.

Step 2

A solution of 200 g. of 2,5-dimethoxycinnamic acid in 1100 ml. of isopropanol was shaken with hydrogen in a Parr bottle in the presence of a 5% palladium on barium sulfate catalyst and the hydrogenation was carried out to theoretical uptake. The catalyst was filtered and the solution treated with charcoal and then stripped to dryness yielding 2,5-dimethoxyhydrocinnamic acid.

Step 3

2,5-dimethoxyhydrocinnamic acid (5.3 kg.) was dissolved in five liters of 48% hydrobromic acid solution. The reaction mixture was brought to reflux to distill off all the low boiling material up to 120° C. Refluxing was continued for about three hours. After cooling the mixture to room temperature, the precipitated lactone was filtered and washed with water.

Step 4

A solution of 730 g. of sodium hydroxide in 12.5 l. of water was deaerated and then 750 g. of the lactone of step 3 were added to it. The reaction mixture was stirred at room temperature for two hours and then cooled at 10° C. Two kg. of ethyl chloroformate were added at a slow enough rate to maintain the temperature at 10° C. The reaction mixture was stirred for an additional 30 min. and acidified to pH 2.0 with 1.8 liter 10% hydrochloric acid solution. The water was decanted from the oil which formed, the oil was then washed several times with water to remove any unreacted ethyl chloroformate. The oil was then allowed to solidify overnight to provide crude 2,5-dicathyloxyhydrocinnamic acid.

The crude product was purified by dissolving 200 gms. of the product of step 4 in two liters of ligroin. The solution was heated to 80° C. and one liter benzene was added to complete solution while the temperature was maintained at ~80° C. The solution was treated with charcoal and filtered hot. On cooling, the pure product precipitated out and the product was then filtered and washed with hexane.

Step 5

The product of step 4 (890 g.) was heated to reflux overnight with 3.4 l. of thionyl chloride. Excess thionyl chloride was removed by distillation in vacuo and the residue cooled to room temperature. One liter of dry benzene was added and the solution was treated with charcoal and filtered. The solution was then added to 10 l. of hexane which had been pre-cooled to −25° C. and the acid chloride precipitated. The 3-(2,5-dicathyloxyphenyl)propionyl chloride was then filtered and dried thoroughly.

Step 6

A solution was prepared containing 270 g. of cyclopentanone morpholine enamine and 120 ml. triethylamine in 870 ml. of dry benzene. A solution of 600 g. 3-(2,5-dicathyloxyphenyl)propionyl chloride in 870 ml. of dry benzene was added with stirring to the morpholine enamine solution. Triethylamine hydrochloride precipitated and the resulting slurry was stirred at reflux for 1½ hr. The slurry was then cooled and 290 ml. of 1.0 N hydrochloric acid were added. The reaction mixture was refluxed for an additional two hours. On cooling, the organic layer was separated and washed several times with water. After drying the organic layer over anh. magnesium sulfate the benzene was stripped off, leaving the blocked ligand developer of Formula 1, as a viscous oil.

The morpholine enamine used in step 6 was prepared as follows:

A solution of 1.568 kg. of morpholine and 756 g. of cyclopentanone in 2.7 l. benzene was refluxed overnight while removing the water which formed with a Dean-Stark trap. After stripping off the benzene, the residue was distilled at 70–80° C. at 0.5 mm. Hg to give the morpholine enamine.

EXAMPLE 2

The following example illustrates the saponification of a compound of Formula 1 in a partially aqueous alkaline medium followed by acidification to a pH below 6.0.

Nitrogen was passed through a solution containing 39.2 g. (0.1 mole) of 2-[3-(2,5-dicathyloxyphenyl)propionyl] cyclopentanone in 600 ml. of methanol for two hours. A similarly deoxygenated aqueous 20% w./w. sodium hydroxide solution was added under ice-bath cooling over a period of 30 mins. under an atmosphere of nitrogen. The solution was stirred under cooling for 45 mins., then for three hours at room temperature. Aqueous 38% w./w. hydrochloric acid was added under cooling until the pH was approximately 1. The mixture was filtered and about 250 ml. of methanol distilled off under reduced pressure at 40–50° C. The remaining solution was diluted with water until a milky suspension resulted. The product was extracted with several portions of ethyl acetate and methylene chloride. After drying over anh. magnesium sulfate, the solvent was removed at 40–40° C. (10 mm.), giving 24.8 g. of a yellow-brown oil.

Analysis of the yellow brown oil by gas liquid chromatography of the trimethylsilyl derivative (SE–30 column, 300°) revealed the following main constituents: 19.6% of the compound of Formula 21 (retention time 1.8 mins.), ca. 20% of a compound of Formula 2 (retention time 2.4 mins.), 54% of the compound of Formula 18 (retention time 2.2 mins.), and 5% of the compound of Formula 17.

EXAMPLE 3

The following example illustrates the saponification of a compound of Formula 1 in a non-aqueous alkali medium followed by acidification to a pH below 6.0.

A solution containing 19.6 g. (0.05 mole) of the compound 2-[3-(2,5-dicathyloxyphenyl)propionyl cyclopentanone in 100 m. of n-propanol was deaerated with nitrogen for one hour. A solution of 20.0 g. (0.5 mole) of sodium hydroxide in 500 ml. of n-propanol was similarly deaerated, then added under stirring to the solution of the ligand under nitrogen. The mixture was kept at room temperature for four hours and then cooled to 5° C. Hydrogen chloride gas was passed through the solution until a pH 1 was obtained on pH indicator paper. Sodium chloride was filtered and propanol was removed under reduced pressure, yielding 12.2 g. (98.2% theory) of the compound of Formula 21 as a yellow solid, 94.0% pure by VPC. Recrystallization from ethyl acetate in 93% yield gave yellow needles, M.P. 203–206.0° C.;

$\lambda_{max.}^{CH_3OH}$ 296 m$\mu$, $\epsilon$=18,397; 310 m$\mu$, $\epsilon$=17,180;

no Ce$^{+4}$ or enol titration; TLC R$_f$ 0.49; NMR (in acetone d$_6$):$\delta$=8.2 (1H, hydroxyl, exchangeable with D$_2$O), $\delta$=6.75–7.0 (3H, aromatic), $\delta$=1.75–3.40 (9.4H, aliphatic) (3H, aromatic), $\delta$=1.75–3.40 (9.4H, aliphatic).

Analysis.—Calcd. for $C_{14}H_{14}O_3$: C, 73.02; H, 6.13; O, 20.85. Found: C, 73.27; H, 6.39; O, 20.37.

EXAMPLE 4

The following example illustrates the preferred practice of the present invention.

A solution of 19.6 g. (0.05 mole) of the compound 2-[3-(2,5-dicathyloxyphenyl)propionyl] cyclopentanone in 50 ml. of isopropanol was deaerated with nitrogen for 30 min. A solution of 20 g. (0.5 mole) of potassium hydroxide in 350 ml. of isopropanol was added with stirring under a nitrogen atmosphere, while keeping the temperature below 50° C. The mixture was allowed to cool to room temperature over a period of three hours. The reaction mixture was slowly acidified with approximately 50 ml. of glacial acetic acid, keeping the temperature below 30° C., to a pH of 6.9 as measured on a pH meter. The mixture was cooled to 10° C. and potassium acetate was filtered. Solvent was removed under reduced pressure, below 45° C., yielding a white-yellow solid. The solid was slurried with 100 ml. of water, filtered, and dried at 50° C. This yielded 11.8 g. (95.0% theory) of the compound 2-[3-(2,5 - dihydroxyphenyl)propionyl] cyclopentanone as a pale yellow solid, M.P. 118.5–120.0° C.

Recrystallization from an ethyl acetate-cyclohexane mixture (8 ml. ethyl acetate and 6 ml. cyclohexane per gram) in 88.0% yield did not change the M.P.;

$\lambda_{max.}^{CH_3OH}$ 294 m$\mu$, $\epsilon$=8,900; 229 m$\mu$, $\epsilon$=3,105.

No Ce$^{+4}$ titration, enol titration 98.8% TLC R$_f$ 0.30; NMR (in acetone d$^6$): $\delta$=8.0 (2H, hydroxyls, exchangeable with D$_2$O), $\delta$=6.38–6.80 (3H, aromatic), $\delta$= 1.60–3.80 (9.6H, aliphatic).

Analysis.—Calcd. for $C_{14}H_{16}O_4$: C, 67.73; H, 6.50; O, 25.78. Found: C, 67.71; H, 6.58; O, 25.77.

The features and advantages of the process of the present invention will be readily apparent by a comparison of the results of Examples 2 and 3 with the results obtained in accordance with the preferred practice of the present invention, e.g., Example 4. Thus in Example 2 the saponification of a compound of Formula 1 in a partially aqueous medium provides a mixture of products wherein the compound of Formula 17 is the predominant product. Acidification of this mixture provides a yield of about 20% of a compound of Formula 2. However, in accordance with one aspect of the present invention, it has been discovered that the formation of the compound of Formula 17 as well as those of Formulas 18–20 can be avoided if the saponification is conducted in an essentially non-aqueous media of the type described before. Also, in accordance with another aspect of the present invention it has been discovered that saponification of a compound in Formula 1 in non-aqueous media is not enough to assure high yields of a compound of Formula 2. Instead as demonstrated by Example 3, the acidification of the saponification product must be carefully controlled. Otherwise, the yield of a compound of Formula 2 is reduced by the formation of the compound of Formula 21. The compound of Formula 21 is considered to be a cyclized dehydrated product of the compound of Formula 22 and it begins to form at a pH of about 6.5 and forms in increasing amounts as the pH approaches 1.0. Accordingly, the essence of the invention of the present case resides in the discovery that there is a unique cause and effect relationship between the yield of a compound of Formula 2 and control over the saponification media and subsequent acidification step. Other reaction parameters involved in converting the compound of Formula 1 to the compound of Formula 2 such as time, temperature, pressure, reaction environment, etc. will be apparent to those skilled in the art from the foregoing disclosure. For example, it will be apparent to those skilled in the art that the saponification step should be conducted in a non oxidizing environment.

It will also be apparent to those skilled in the art that the compound of Formula 2 can exist in tautomeric or isomeric forms such as those denoted by the following formulae:

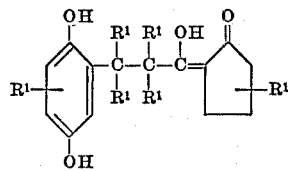

and

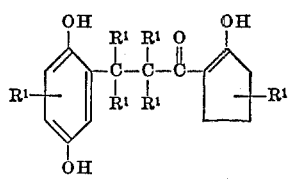

Compounds of such structures are included with the scope of the compounds of Formula 2.

Since certain changes may be made in the above process without departing from the scope of the invention herein involved, it is intended that all matter contained in the above description shall be interpreted as illustrative and not in a limiting sense.

What is claimed is:

1. In the process wherein a compound of the following formula:

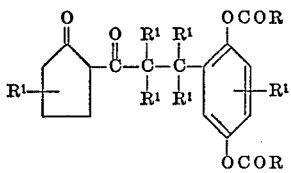

FORMULA 1.

is converted to a compound of the following formula:

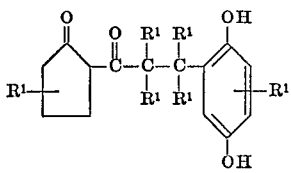

FORMULA 2.

and wherein R of the —OCOR moiety at the ortho and para position of the phenyl moiety is selected from the group consisting of alkyl radicals, alkoxy radicals, aryl radicals, or aralkyl radicals and each $R^1$ is a substituent selected from the group consisting of hydrogen, alkyl radicals, alkoxy radicals, aryl radicals, amino radicals or an alkamino radical which will not affect the functionality of the compound of Formula 2 as a silver halide developing agent; the improvement wherein the compound of Formula 1 is saponified in a non-aqueous alkaline medium comprising a solution of an alkali metal in an alcohol and the saponified product is acidified to a pH of between about 6.0 to about 7.0.

2. In the process wherein a compound of the following formula:

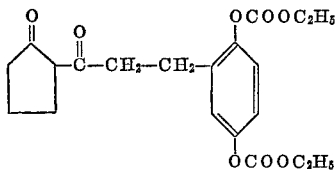

is converted to a compound of the following formula:

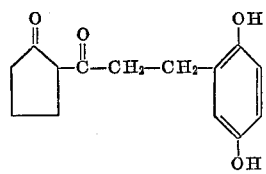

the improvement wherein the compound of the first formula is saponified in an non-aqueous alkaline medium comprising a solution of an alkali metal hydroxide in an alcohol and the saponified product is acidified to a pH of between about 6.0 to about 7.0.

3. A process of claim 2 wherein said product is acidified to a pH between about 6.5 to about 7.0.

4. A process of claim 2 wherein said non-aqueous alkaline medium comprises a solution of an alkali metal hydroxide chosen from the group consisting of sodium hydroxide potassium hydroxide or mixtures thereof in an alcohol chosen from the group consisting of methanol, ethanol, propanol, isopropanol, methyl Cellosolve or mixtures thereof.

5. A process of claim 2 wherein said product is acidified to a pH between 6.0 to 7.0 by adding an organic acid selected from the group consisting of acetic acid, benzoic acid, citric acid, maleic acid, oxalic acid, tartaric acid or mixtures thereof directly to said medium.

6. A process of claim 2 wherein said product is acidified to a pH of about 6.5 to about 7.0 by adding an organic acid selected from the group consisting of acetic acid, benzoic acid, citric acid, maleic acid, oxalic acid, tartaric acid or mixtures thereof directly to said medium.

7. A process which comprises the steps of saponifying a compound of the formula

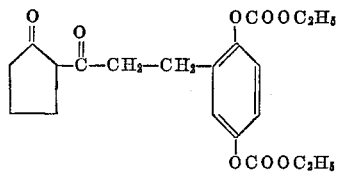

in a solution of an alkali metal hydroxide in an alcohol and acidifying the solution to a pH between about 6.5 to about 7.0.

8. A process of claim 7 wherein said alkali metal hydroxide is chosen from the group consisting of sodium hydroxide, potassium hydroxide or mixtures thereof and said alcohol is chosen from the group consisting of methanol, ethanol, propanol, isopropanol and methyl Cellosolve.

9. A process of claim 7 wherein said solution is acidified by adding an organic acid thereto selected from the group consisting of acetic acid, benzoic acid, citric acid, maleic acid, oxalic acid, tartaric acid or mxtures thereof.

10. A process of claim 7 wherein said solution is a solution of potassium hydroxide in isopropanol and said solution is acidified to a pH of about 6.9 by adding acetic acid thereto.

References Cited

UNITED STATES PATENTS 3,551,406  12/1970  Idelson _____ 260—590
3,629,336  12/1971  Idelson _____ 260—590

DANIEL D. HORWITZ, Primary Examiner

U.S. Cl. X.R.

96—29 D; 260—577, 578, 345.2, 343.5, 521 R, 463, 313.1